United States Patent
Domsch et al.

(10) Patent No.: US 8,842,562 B2
(45) Date of Patent: Sep. 23, 2014

(54) METHOD OF HANDLING NETWORK TRAFFIC THROUGH OPTIMIZATION OF RECEIVE SIDE SCALING

(75) Inventors: Matthew L. Domsch, Austin, TX (US); Hendrich M. Hernandez, Round Rock, TX (US); Robert L. Winter, Leander, TX (US); Shawn J. Dube, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 342 days.

(21) Appl. No.: 13/281,192

(22) Filed: Oct. 25, 2011

(65) Prior Publication Data

US 2013/0103871 A1 Apr. 25, 2013

(51) Int. Cl.
  *H04L 12/28* (2006.01)
  *H04L 12/56* (2006.01)
  *G06F 15/16* (2006.01)
  *G06F 9/46* (2006.01)

(52) U.S. Cl.
  USPC .......... 370/252; 370/389; 370/395; 709/201; 718/102

(58) Field of Classification Search
  USPC .......... 370/235–252, 389–412; 709/201–230
  See application file for complete search history.

(56) References Cited

U.S. PATENT DOCUMENTS

| | | | |
|---|---|---|---|
| 7,257,572 B2 * | 8/2007 | Eldar | 1/1 |
| 7,548,513 B2 * | 6/2009 | Tran | 370/235 |
| 7,584,286 B2 | 9/2009 | Goglin et al. | |
| 7,787,453 B2 * | 8/2010 | Tran et al. | 370/389 |
| 8,085,769 B2 * | 12/2011 | Cornett et al. | 370/389 |
| 8,589,941 B2 * | 11/2013 | Cardona et al. | 718/105 |
| 2006/0182031 A1 | 8/2006 | Tran | |
| 2006/0227788 A1 * | 10/2006 | Eldar et al. | 370/395.4 |
| 2008/0086575 A1 * | 4/2008 | Foong et al. | 709/250 |
| 2009/0006521 A1 * | 1/2009 | Veal et al. | 709/201 |
| 2010/0061377 A1 | 3/2010 | Goglin et al. | |
| 2010/0064286 A1 | 3/2010 | Pinter et al. | |
| 2010/0083259 A1 * | 4/2010 | Veal et al. | 718/102 |
| 2010/0333101 A1 | 12/2010 | Pope et al. | |
| 2012/0189013 A1 * | 7/2012 | Goglin et al. | 370/395.32 |
| 2012/0215932 A1 * | 8/2012 | Shemesh | 709/230 |

OTHER PUBLICATIONS

Huggahalli, "Direct Cache Access for High Bandwidth Network I/O," IEEE 2005; http://portal.acm.org/citation.cfm?id=1069976.
"Scalable Networking: Eliminating the Receive Processing Bottleneck—Introducing RSS," Microsoft, WinHEC, Apr. 2004; http://msdn.microsoft.com/en-us/library/ff556942(d=printer,v=vs.85),asox.

\* cited by examiner

*Primary Examiner* — Man Phan
(74) *Attorney, Agent, or Firm* — Larson Newman, LLP

(57) ABSTRACT

An information handling system includes a plurality of processors that each includes a cache memory, and a receive side scaling (RSS) indirection table with a plurality of pointers that each points to one of the processors. A network data packet received by the information handling system determines a pointer to a first processor. In response to determining the pointer, information associated with the network data packet is transferred to the cache memory of the first processor, The information handling system also includes a process scheduler that moves a process associated with the network data packet from a second processor to the first processor, and an RSS module that directs the process scheduler to move the process and associates the first pointer with the processor in response to directing the process scheduler.

17 Claims, 4 Drawing Sheets

METHOD OF HANDLING NETWORK TRAFFIC THROUGH OPTIMIZATION OF RECEIVE SIDE SCALING

FIELD OF THE DISCLOSURE

The present disclosure generally relates to information handling systems, and more particularly relates to handling network traffic in an information handling system through optimization of receive side scaling.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. Other teachings can be used in this application, and the teachings can be used in other applications and with different types of architectures, such as a client-server architecture, a distributed computing architecture, or a middleware server architecture and associated resources.

Figure 1:
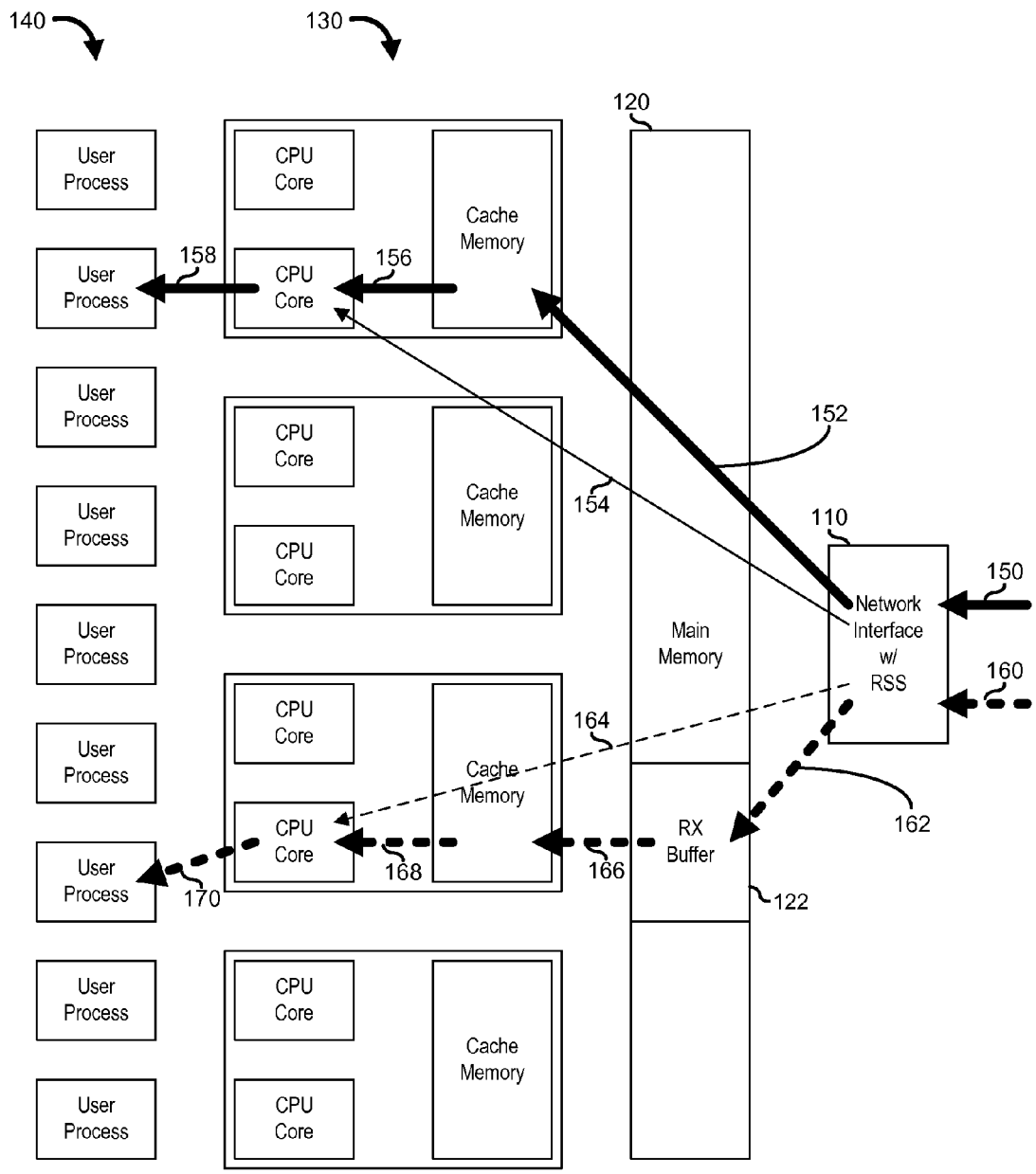
FIG. 1 is a block diagram of an information handling system with a network interface that implements receive side scaling according to an embodiment of the present disclosure.

FIG. 1 illustrates an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, information handling system 100 includes a network interface 110, a main memory 120, a group of processors 130 each including one or more central processing unit (CPU) cores and a cache memory, and a group of user processes 140. Network interface 110 represents an interface device between information handling system 100 and an external network (not illustrated), and operates to provide receive side scaling for network traffic received by the information handling system. In a particular embodiment, when network traffic 150 is received by network interface 110, the information 152 included in the network traffic is sent to the cache of the processor 130 that is associated with the network flow, and an interrupt 154 is provided to the CPU core associated with the network traffic. When the CPU core receives interrupt 154, the CPU core retrieves the data 156 and provides the data 158 to the user process 140 associated with the network traffic. In another embodiment, when network traffic 160 is received by network interface 110, the information 162 included in the network traffic is sent to a receive buffer 122 of main memory 120, and an interrupt 164 is provided to the CPU core associated with the network traffic. The CPU core retrieves the information 166 to the cache memory of the processor 130 that is associated with the network flow, retrieves the data 168 from the cache memory, and provides the data 170 to the user process 140 associated with the network traffic.

Network interface 110 can be implemented as a network interface card (NIC) of information handling system 100 or as a network capability that resides on a system board of the information handling system. In implementing receive side scaling (RSS), network interface 110 can provide interrupts 154 and 164 as hardware interrupts, as software interrupts, as virtual interrupts in a virtual machine environment, or as a combination thereof. In a particular embodiment, the RSS capability of network interface 110 is limited as to the number of available RSS channels, and by extension, to the number of processors 130 that can be used to handle network traffic. In particular, the number of RSS channels can be less than the number of processors 130 in information handling system 100. In one embodiment, the processors 130 that are associated with the RSS channels are predetermined by a firmware component of network interface 110 when information handling system 100 is powered on. In another embodiment network interface 110 operates to determine if a particular processor 130 is idle or lightly loaded, and modifies the associations between the RSS channels and the processors to provide the task of handling network traffic to idle or lightly loaded processors.

In yet another embodiment, network interface 110 operates in conjunction with a CPU scheduler (not illustrated) to optimize the loading of network traffic tasks by ensuring that the network processing is performed by a processor 130 that is also handling the user process 140 associated with the network traffic. As such, network interface 110 can provide a prompt to the CPU scheduler to move a particular task associated with a network traffic flow to a processor 130 that is associated with an RSS channel, or the CPU scheduler can modify the associations between the RSS channels and the processors to map the network data directly to the user process 140 associated with the network traffic flow. In a particular embodiment, network interface 110 operates with the CPU scheduler to optimize the loading of network traffic tasks in response to changes in the flow rate of network traffic into the network interface.

In another embodiment, the selection of a particular RSS channel is based upon the application of a hashing function to incoming data packets. Here, network interface 110 can choose from among several hashing methods, or can select different fields, or tuples, of the data packets on which the hashing methods operate, in order to more effectively optimize the processing network traffic flows. In another embodiment, the CPU scheduler modifies the associations between the RSS channels and processors 130 based upon prompts received from network traffic intensive applications, or can track outgoing network traffic from the processors and modifies the associations based upon the outgoing network traffic. In another embodiment, user process 140 can provide prompts to the CPU scheduler or to network interface 110 to modify the associations.

Figure 2:
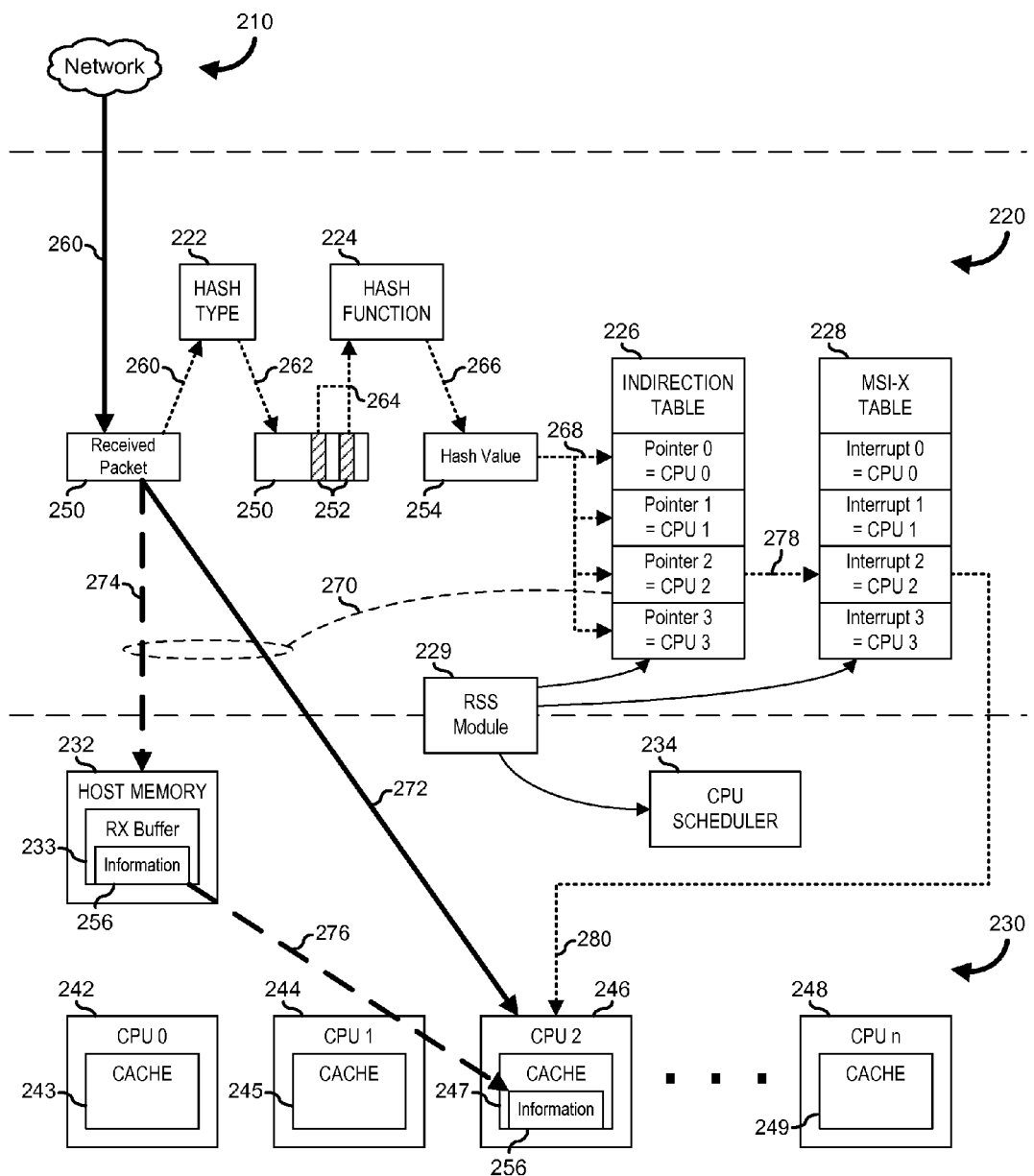
FIG. 2 is a block diagram of an information handling system similar to the information handling system of FIG. 1 according to an embodiment of the present disclosure.

FIG. 2 illustrates an information handling system 200 that is similar to information handling system 100, including a network interface 220 and a host system 230. Network interface 220 includes a hash type module 222, a hash function module 224, an RSS indirection table 226, a message signaled interrupt (MSI-X) table 228, and an RSS module 229. Host system 230 includes a host memory 232, a CPU scheduler 234, and CPUs 0-*n* (labeled 242, 244, 246, and 248, respectively. Host memory 232 includes a receive buffer 233, and each CPU 242-248 includes a respective cache memory 243, 245, 247, and 249. Network interface 220 is connected to a network 210 to receive network data traffic. As illustrated, MSI-X table 228 is shown as a part of network interface 220, but this need not always be so. For example, MSI-X table 228 can be implemented as part of a chipset component of host system 230, or elsewhere in information handling system 200, as needed or desired.

In operation, information handling system 200 performs functions similar to information handling system 100, as described above. In particular, when a data packet 250 is received 260, the data packet is analyzed by hash type module 222 to determine 262 one or more fields 252, or tuples of the data packet that are to be analyzed by hash function module 224, and the fields are forwarded 264 to the hash function module for determination 266 of a hash value 254 of the received data packet. Hash value 254 is provided 268 as a pointer into indirection table 226. For example, as illustrated, indirection table 226 includes four RSS channels such that when hash value 254 is in a first range of values, a pointer 0 is selected that points to CPU 0 (242), when hash value 254 is in a second range of values, a pointer 1 is selected that points to CPU 1 (244), when hash value 254 is in a third range of values, a pointer 2 is selected that points to CPU 2 (246), and when hash value 254 is in a fourth range of values, a pointer 3 is selected that points to CPU 3 (248). Indirection table 226 can include more or fewer RSS channels, as needed or desired. When a particular pointer is selected from indirection table 226, such as pointer 2 in the illustrated example, the information 256 that is extracted from data packet 250 is directed 270 by the indirection table pointer to be transferred 272 to the cache 247 of the selected CPU 246.

When the pointer is selected from indirection table 226, the pointer also serves to select 278 an entry from MSI-X table 228. In a particular embodiment, there is a one-to-one correspondence between the number of RSS channels implemented on network interface 220, that is, the number of pointers in indirection table 226, and the number of interrupts implemented in MSI-X table, but this is not necessarily so. For example, pointer 0 corresponds to interrupt 0 that serves to direct an interrupt to CPU 0 (242), pointer 1 corresponds to interrupt 1 that serves to direct an interrupt to CPU 1 (244), pointer 2 corresponds to interrupt 2 that serves to direct an interrupt to CPU 2 (246), and pointer 3 corresponds to interrupt 3 that serves to direct an interrupt to CPU 3 (248). When a particular interrupt is selected from MSI-X table 228, such as interrupt 2 in the illustrated example, an interrupt 280 is generated to the selected CPU 246. In another embodiment, when the pointer is selected from indirection table 226, the information 256 that is extracted from data packet 250 is directed 270 by the indirection table pointer to be transferred 274 to the receive buffer 233 of host memory 232. Then, when the interrupt 280 is generated to the selected CPU 246, the selected CPU operates to read information 256 from RS buffer 233 to cache 247.

Figure 3:
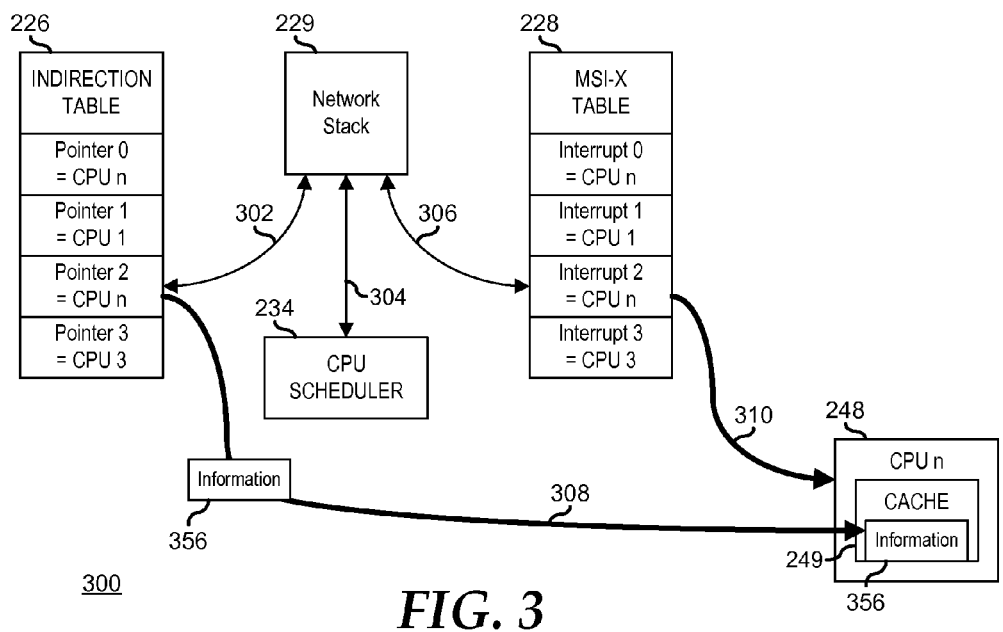
FIG. 3 is a block diagram illustrating a portion of the information handling system of FIG. 2 according to an embodiment of the present disclosure.

In one embodiment, the CPUs 242-248 that are associated with the RSS channels are predetermined by a firmware component of network interface 220 when information handling system 200 is powered on. In another embodiment illustrated in FIG. 3, CPU scheduler 234 operates to determine if a particular CPU 242, 244, 246, or 248 is idle or lightly loaded, illustrated here as CPU n (248). Then CPU scheduler 234 directs 304 RSS module 229 to modify the associations between the RSS channels 302 in indirection table 226 and the interrupts 306 in MSI-X table 228 and the CPUs to provide the task of handling network traffic to idle or lightly loaded processors. In this way, when the hash value is in a range that selects, for example hash 2, the information 356 in an associated data packet is directed 308 to cache 249, and the interrupt 210 is directed to CPU 248. In yet another embodiment, RSS module 229 operates in conjunction with CPU scheduler 234 to optimize the loading of network traffic tasks by ensuring that the network processing is performed by a CPU 242, 244, 246, or 248 that is also handling a user process associated with the network traffic. As such, RSS module 229 can provide a prompt to CPU scheduler 234 to move a particular task associated with a network traffic flow to a processor 242, 244, 246, or 248 that is associated with an RSS channel, or the CPU scheduler can modify the associations between the RSS channels and the CPUs to map the network data directly to the user process associated with the network traffic flow. In a particular embodiment, RSS module 229 operates with CPU scheduler 234 to optimize the loading of network traffic tasks in response to changes in the flow rate of network traffic into the network interface.

In another embodiment, RSS module 229 operates to select a different hash type such that hash type module 222 selects different fields, or tuples, of the data packets on which hash function module 224 operates. In yet another embodiment, RSS module 229 operates to select a different hash function such that hash function module 224 performs a different hash function on the fields provided by hash type module 222, in order to more effectively optimize the processing network traffic flows.

In a particular embodiment, hash type module 222 can operate as a more generalized tuple selector, to select, for example a source or destination IP address field, a TCP port field, or the like. Here further, hash function module 224 can operate to provide a hash value 254 for a particular value of the selected tuple. In this way, a one-to-one mapping between a network flow and a CPU can be established. Here, for example, hash function module 224 can be implemented in whole or in part by a tertiary content addressable memory (TCAM) of an appropriate size.

Figure 4:
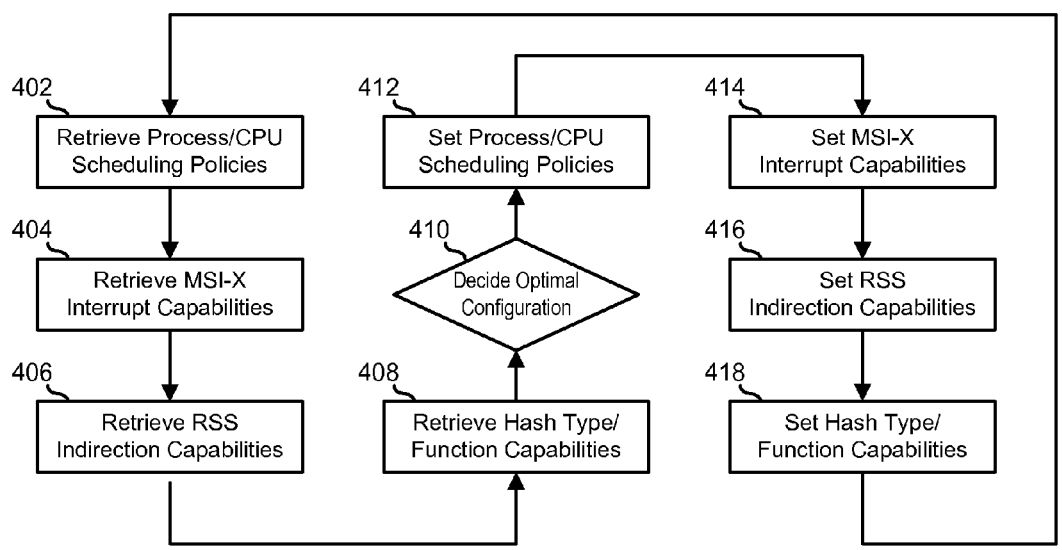
FIG. 4 is a flowchart illustrating a method of handling network traffic in an information handling system through optimization of receive side scaling, according to an embodiment of the present disclosure.

FIG. 4 illustrates method of handling network traffic in an information handling system through optimization of receive side scaling. The method begins in block 402 where scheduling priorities for user processes and CPU utilization are retrieved. For example, RSS module 229 can determine the network traffic needs for a particular user process, and can determine the CPU 242-248 that is being scheduled by CPU scheduler 234 to handle the user process. Further, RSS module 229 can determine that one or more CPU 242-248 is idle, or is currently lightly loaded, and is therefore a candidate for rescheduling to handle the user process and to receive the network traffic flows associated with the user process. The interrupt capabilities for an MSI-X table are retrieved in block 404. For example, RSS module 220 can determine the status of the interrupts in MSI-X table 228. The indirection capabilities for an indirection table are retrieved in block 406. For example, RSS module 220 can determine the status of the pointers in indirection table 226. The hash type and hash function capabilities of the information handling system are retrieved in block 408. For example, RSS module 229 can determine the supported hash types from hash type module 222, and the supported hash functions from hash function module 224. An optimal RSS configuration is determined in block 410. In response to the determination of the optimal RSS configuration, the scheduling priorities for user processes and CPU utilization are set in block 412, the interrupt capabilities for the MSI-X table are set in block 414, the indirection capabilities for the indirection table are set in block 416, the hash type and hash function is set in block 418, and the method returns to block 402 where the scheduling priorities for the user processes and the CPU utilization are retrieved.

In a particular embodiment, in determining the optimal RSS configuration in block 410, a greedy algorithm is implemented which starts with the process and associated networks flows with the highest aggregate frame rate or data rate, and assigns the indirection table entries mapped to by the current hash function for said flows to the CPU or CPUs in use by that process. The algorithm repeats this on the next process with highest aggregate frame rate or data making assignments in the indirection table entries, assuming those entries had not been previously assigned within the algorithm. In another embodiment, in determining the optimal RSS configuration in block 410, a hash selection algorithm is implemented which picks between hash functions (or assignment of hash function parameters) that provide maximize a utility function. The utility function is calculated as the weighted sum of correct number of flows that map in the indirection table to CPUs which currently host a process. The weighting may be based on frame rate or data rate for the given flow. The number of hash functions (or parameter settings) may be excessive so any running of the algorithm may only evaluate a set number of has functions or parameters. In yet another embodiment, in determining the optimal RSS configuration in block 410, both of the above algorithms can be performed concurrently.

Figure 5:
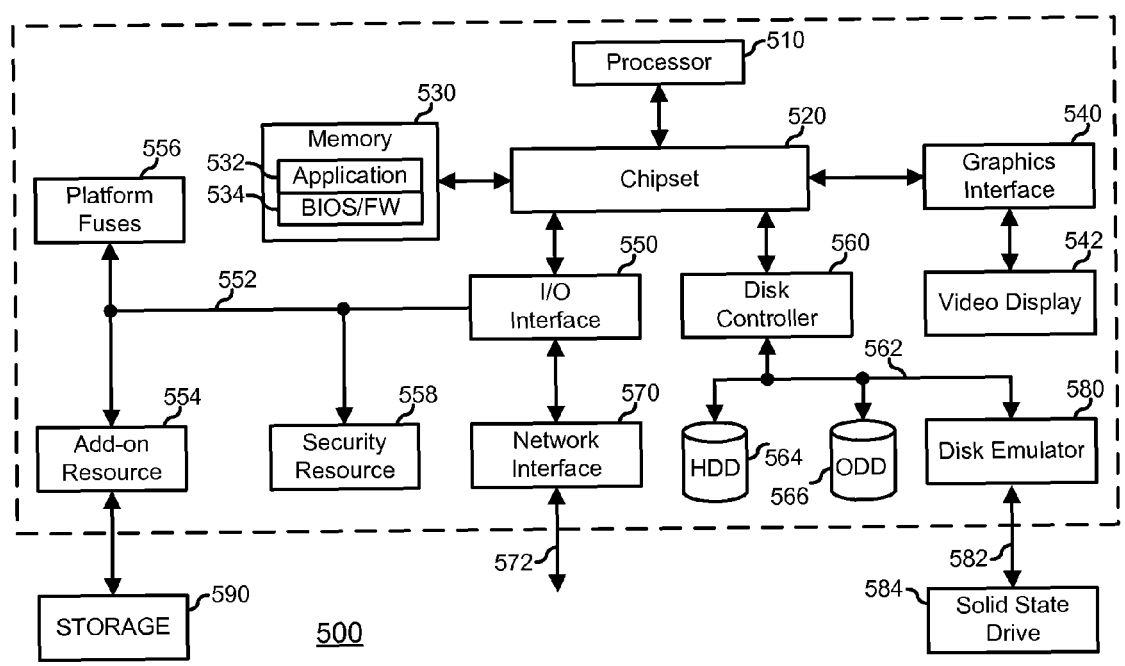
FIG. 5 is a block diagram illustrating an information handling system according to an embodiment of the present disclosure.

FIG. 5 is a block diagram illustrating an embodiment of an information handling system 500, including a processor 510, a chipset 520, a memory 530, a graphics interface 540, an input/output (I/O) interface 550, a disk controller 560, a network interface 570, and a disk emulator 580. In a particular embodiment, information handling system 500 is used to carry out one or more of the methods described herein. In another embodiment, one or more of the systems described herein are implemented in the form of information handling system 500.

Chipset 520 is connected to and supports processor 510, allowing the processor to execute machine-executable code. In a particular embodiment (not illustrated), information handling system 500 includes one or more additional processors, and chipset 520 supports the multiple processors, allowing for simultaneous processing by each of the processors and permitting the exchange of information among the processors and the other elements of the information handling system. Chipset 520 can be connected to processor 510 via a unique channel, or via a bus that shares information among the processor, the chipset, and other elements of information handling system 500.

Memory 530 is connected to chipset 520. Memory 530 and chipset 520 can be connected via a unique channel, or via a bus that shares information among the chipset, the memory, and other elements of information handling system 500. In another embodiment (not illustrated), processor 510 is connected to memory 530 via a unique channel. In another embodiment (not illustrated), information handling system 500 includes separate memory dedicated to each of the one or more additional processors. A non-limiting example of memory 530 includes static random access memory (SRAM), dynamic random access memory (DRAM), non-volatile random access memory (NVRAM), read only memory (ROM), flash memory, another type of memory, or any combination thereof.

Graphics interface 540 is connected to chipset 520. Graphics interface 540 and chipset 520 can be connected via a unique channel, or via a bus that shares information among the chipset, the graphics interface, and other elements of information handling system 500. Graphics interface 540 is connected to a video display 542. Other graphics interfaces (not illustrated) can also be used in addition to graphics interface 540 as needed or desired. Video display 542 includes one or more types of video displays, such as a flat panel display, another type of display device, or any combination thereof.

I/O interface 550 is connected to chipset 520. I/O interface 550 and chipset 520 can be connected via a unique channel, or via a bus that shares information among the chipset, the I/O interface, and other elements of information handling system 500. Other I/O interfaces (not illustrated) can also be used in addition to I/O interface 550 as needed or desired. I/O interface 550 is connected via an I/O interface 552 to one or more add-on resources 554. Add-on resource 554 is connected to a storage system 590, and can also include another data storage system, a graphics interface, a network interface card (NIC), a sound/video processing card, another suitable add-on resource or any combination thereof I/O interface 550 is also connected via I/O interface 552 to one or more platform fuses 556 and to a security resource 558. Platform fuses 556 function to set or modify the functionality of information handling system 500 in hardware. Security resource 558 provides a secure cryptographic functionality and includes secure storage of cryptographic keys. A non-limiting example of security resource 558 includes a Unified Security Hub (USH), a Trusted Platform Module (TPM), a General Purpose Encryption (GPE) engine, another security resource, or a combination thereof.

Disk controller 560 is connected to chipset 520. Disk controller 560 and chipset 520 can be connected via a unique channel, or via a bus that shares information among the chipset, the disk controller, and other elements of information handling system 500. Other disk controllers (not illustrated) can also be used in addition to disk controller 560 as needed or desired. Disk controller 560 includes a disk interface 562. Disk controller 560 is connected to one or more disk drives via disk interface 562. Such disk drives include a hard disk drive (HDD) 564, and an optical disk drive (ODD) 566, and can include one or more disk drive as needed or desired. ODD 566 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 560 is connected to disk emulator 580. Disk emulator 580 permits a solid-state drive 584 to be coupled to information handling system 500 via an external interface 582. External interface 582 can include industry standard busses such as USB or IEEE 1394 (Firewire) or proprietary busses, or any combination thereof. Alternatively, solid-state drive 584 can be disposed within information handling system 500.

Network interface device 570 is connected to I/O interface 550. Network interface 570 and I/O interface 550 can be coupled via a unique channel, or via a bus that shares information among the I/O interface, the network interface, and other elements of information handling system 500. Other network interfaces (not illustrated) can also be used in addition to network interface 570 as needed or desired. Network interface 570 can be a network interface card (NIC) disposed within information handling system 500, on a main circuit board such as a baseboard, a motherboard, or any combination thereof, integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Information handling system 500 includes one or more application programs 532, and Basic Input/Output System and Firmware (BIOS/FW) code 534. BIOS/FW code 534 functions to initialize information handling system 500 on power up, to launch an operating system, and to manage input and output interactions between the operating system and the other elements of information handling system 500. In a particular embodiment, application programs 532 and BIOS/FW code 534 reside in memory 530, and include machine-executable code that is executed by processor 510 to perform various functions of information handling system 500. In another embodiment (not illustrated), application programs and BIOS/FW code reside in another storage medium of information handling system 500. For example, application programs and BIOS/FW code can reside in HDD 564, in a ROM (not illustrated) associated with information handling system 500, in an option-ROM (not illustrated) associated with various devices of information handling system 500, in storage system 590, in a storage system (not illustrated) associated with network channel 572, in another storage medium of information handling system 500, or a combination thereof. Application programs 532 and BIOS/FW code 534 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a plurality of processors, each processor including a cache memory;
   a receive side scaling (RSS) indirection table including a plurality of pointers, each pointer identifying a respective processor, wherein:
      a first network data packet received by the information handling system determines a first one of the pointers, wherein the first pointer identifies a first one of the processors; and
      in response to determining the first pointer, first information associated with the first network data packet is transferred to the cache memory of the first processor;
   a process scheduler that moves a process associated with the first network data packet from a second one of the processors to the first processor;
   an RSS module that:
      directs the process scheduler to move the process; and
      associates the first pointer with the first processor in response to directing the process scheduler; and
   a message signaled interrupt (MSI-X) table including a plurality of interrupts, wherein each interrupt:
      is associated with a respective pointer; and
      identifies the respective processor, such that when an associated pointer is determined, the MSI-X table provides an interrupt to the respective processor;
      wherein the RSS module further associates a first interrupt with the first processor in response to directing the process scheduler.

2. The information handling system of claim 1, further comprising:
   a hash type module that implements a plurality of hash type operations, each hash type operation being operable to select a field of the first network data packet;
   wherein:
      determining the first pointer is in response to the hash type module implementing a first one of the hash type operations; and
      the RSS module further selects the first hash type operation.

3. The information handling system of claim 2, wherein the RSS module selects the first hash type operation in response to determining a load on the first processor.

4. The information handling system of claim 1, further comprising:
   a hash function module that implements a plurality of hash function operations, each hash function operation being operable to select a hash function to perform on the first network data packet;
   wherein:
      determining the first pointer is in response to the hash function module implementing a first one of the hash function operations; and
      the RSS module further selects the first hash function operation.

5. The information handling system of claim 4, wherein the RSS module selects the first hash function in response to determining a load on the first processor.

6. The information handling system of claim 1, wherein the process scheduler:
   moves the process from the first processor to a third one of the processors; and
   directs the RSS module to associate the first pointer with the third processor in response to moving the process to the third processor.

7. The information handling system of claim 1, wherein:
   a second network data packet received by the information handling system determines a second pointer that identifies a third one of the processors; and
   in response to determining the second pointer, second information associated with the second network data packet is transferred to the cache memory of the third processor.

8. The information handling system of claim 1, wherein transferring the first information includes:
   transferring the first information to a receive memory buffer of the information handling system; and
   transferring the first information from the receive memory buffer to the first cache memory of the first processor.

9. A network interface device comprising:
   a receive side scaling (RSS) indirection table including a plurality of pointers, each pointer identifying a respective processor, wherein:
      a first network data packet received by the network interface device determines a first one of the pointers, wherein the first pointer identifies a first one of the processors; and
      in response to determining the first pointer, first information associated with the first network data packet is transferred to the cache memory of the first processor;
   an RSS module that:
      directs a process scheduler to move a process associated with the first network data packet from a second one of the processors to the first processor; and
      associates the first pointer with the first processor in response to directing the process scheduler; and
   a message signaled interrupt (MSI-X) table including a plurality of interrupts, wherein each interrupt:
      is associated with a respective pointer; and
      identities the respective processor, such that when an associated pointer is determined, the MSI-X table provides an interrupt to the respective processor;
      wherein the RSS module further associates a first interrupt with the first processor espouse to directing the process scheduler.

10. The network interface device of claim 9, further comprising:
    a hash type module that implements a plurality of hash type operations, each hash type operation being operable to select a field of the first network data packet;
    wherein:
       determining the first pointer is in response to the hash type module implementing a first one of the hash type operations; and
       the RSS module further selects the first hash type operation.

11. The network interface device of claim 9, further comprising:

a hash function module that implements a plurality of hash function operations, each hash function operation being operable to select a hash function to perform on the first network data packet;
wherein:
    determining the first pointer is in response to the hash function module implementing a first one of the hash function operations; and
    the RSS module further selects the first hash function operation.

12. The network interface of claim 11, wherein the RSS module selects the first hash function operation in response to determining a load on the first processor.

13. The network interface device of claim 9, wherein the RSS module associates the first pointer with a third one of the processors in response to the process scheduler moving the process from the first processor to the third processor.

14. The network interface device of claim 9, wherein:
a second network data packet received by the network interface device determines a second pointer that identifies a third one of the processors; and
in response to determining the second pointer, second information associated with the second network data packet is transferred to the cache memory of the third processor.

15. A method comprising:
retrieving a process scheduling policy from a process scheduler of an information handling system;
retrieving a receive side scaling (RSS) indirection table of the information handling system;
determining an optimal processor of the information handling system on which to run a process, wherein the determining is in response to retrieving the process scheduling policy and to retrieving the RSS indirection table;
in response to determining the optimal processor;
    scheduling by the process scheduler the process on the optimal processor; and
    setting an RSS pointer of the RSS indirection table to point to the optimal processor;
retrieving a message signaled interrupt table of the information handling system; and
setting MSI-X pointer of the MSI-X table to provide an interrupt to the optimal processor in further response to determining the optimal processor;
wherein the determining is in further response to retrieving the MSI-X table.

16. The method of claim 15, further comprising:
retrieving a hash type capability of the information handling system; and
setting a hash type in further response to determining the optimal processor;
wherein the determining is in further response to retrieving the hash type capability.

17. The method of claim 15, further comprising:
retrieving a hash function capability of the information handling system; and
setting a hash function in further response to determining the optimal processor;
wherein the determining is in further response to retrieving the hash function capability.

* * * * *